Patented July 21, 1925.

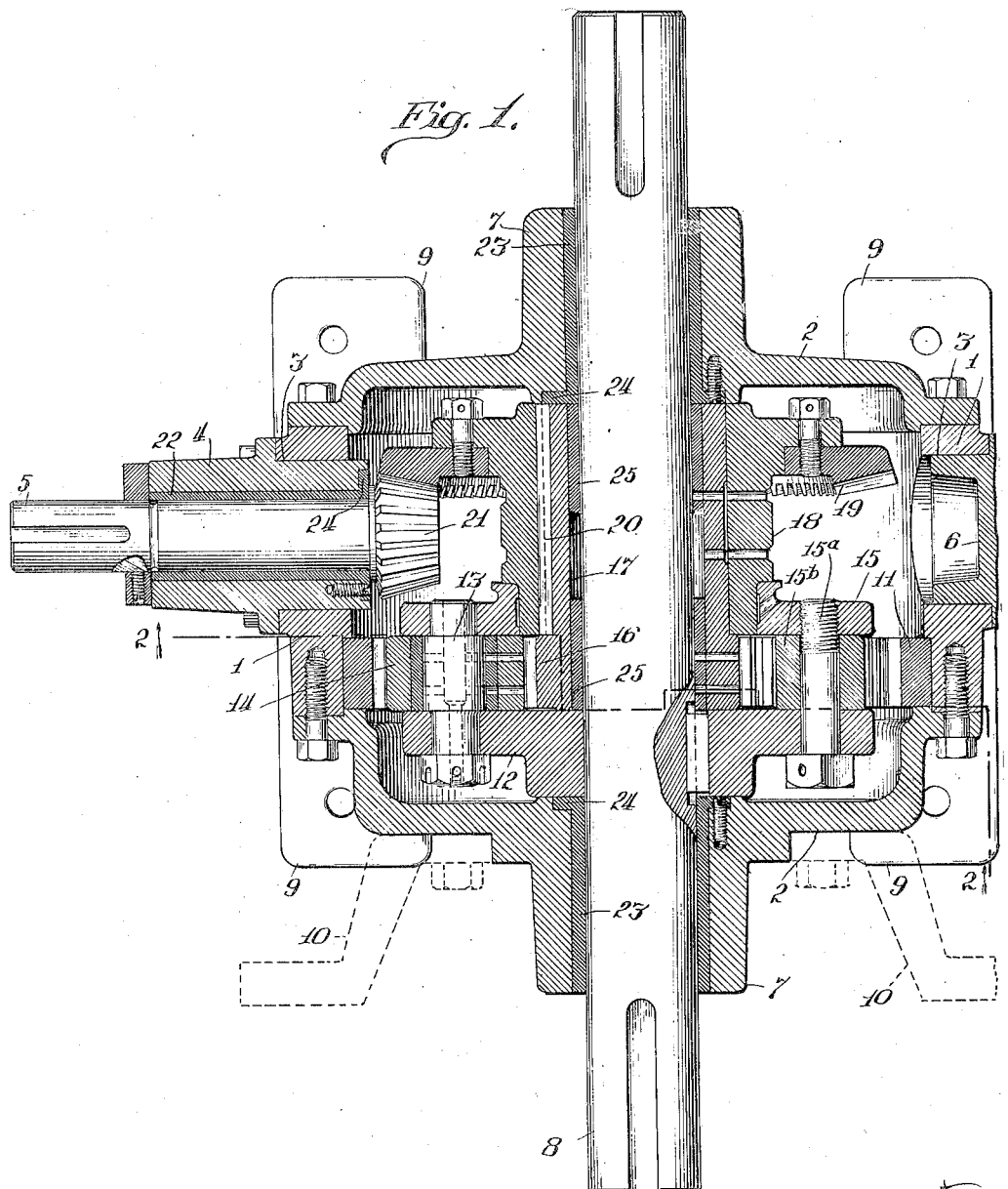

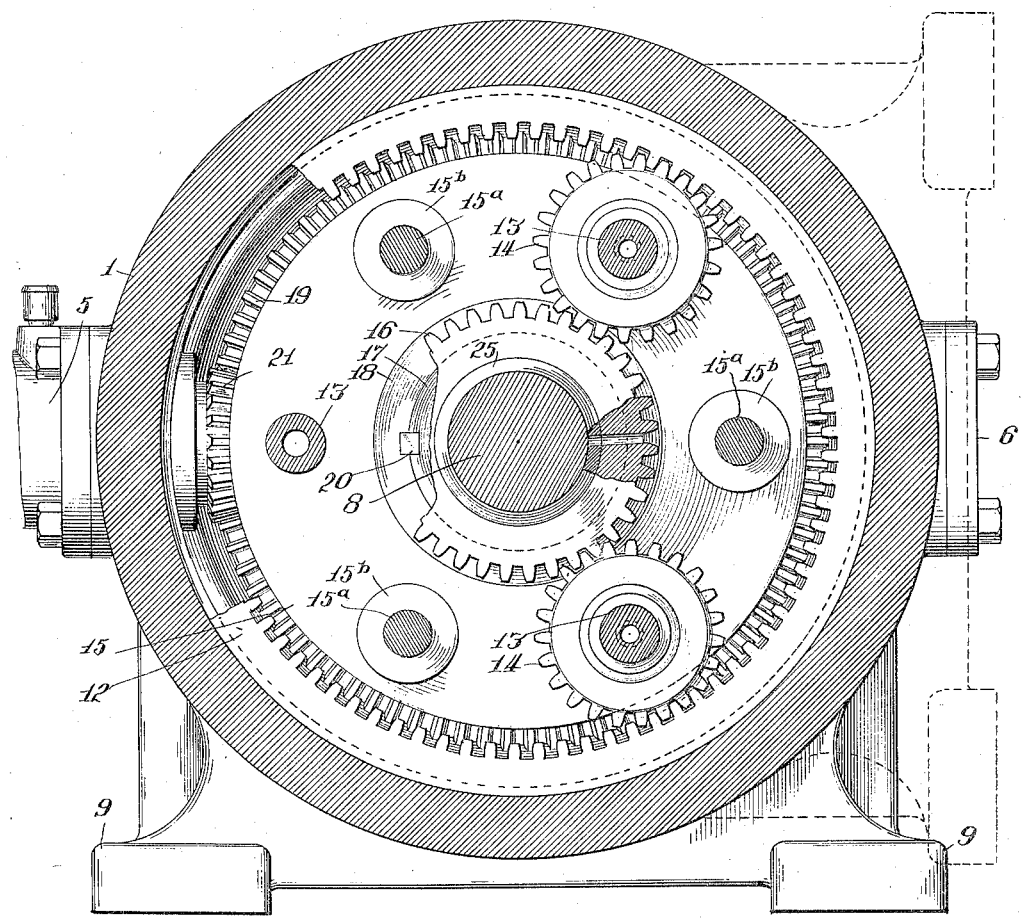

1,546,967

UNITED STATES PATENT OFFICE.

LOUIS E. G. BUEHLER, OF CHICAGO, ILLINOIS.

LATERAL-DRIVE SPEED TRANSFORMER.

Application filed April 7, 1924, Serial No. 704,552. Renewed January 15, 1925.

*To all whom it may concern:*

Be it known that I, LOUIS E. G. BUEHLER, a citizen of the United States, residing at Chicago, in the county of Cook, State of Illinois, have invented certain new and useful Improvements in Lateral-Drive Speed Transformers, of which the following is a specification.

This invention relates to speed transformers and more particularly to speed reducing gears and has for its object to provide a device of this character adapted for transmitting power from a high-speed shaft to a laterally or angularly disposed low-speed shaft in such manner as to employ the minimum number of gear elements and effect such compact relative arrangement thereof as will permit all of the same to be housed in a casing of relatively small dimensions proportionately to the ratio of reduction of the gear.

A further and particular object of the invention is to provide a speed transformer of the class above specified which can be associated with the low-speed shaft at any desired point between the ends thereof as distinguished from an extreme end thereof to thereby secure the advantage of a more advantageous distribution of torsional strains and stresses in the low-speed shaft and a consequent reduction in fraction at the bearings in which it is journalled.

Another object of the invention is to provide an encased speed transformer of the type set forth which may be interchangeably so associated with the high and low-speed shafts as to effect rotation of the low-speed shaft either clockwise or anti-clockwise without changing the direction of rotation of the high-speed shaft.

The preferred embodiment of the invention is illustrated in the accompanying drawings, wherein:—

Fig. 1 is a central longitudinal section of a speed-transformer constructed in accordance with the invention.

Fig. 2 is a transverse section of the same on the line 2—2 of Fig. 1.

The device includes a casing having a substantially cylindrical wall 1 and opposed heads 2 bolted or otherwise detachably secured to the wall 1, the latter being provided with a plurality of openings 3. There are preferably two diametrically opposed openings 3, into one of which the bearing 4 for the high-speed shaft 5 is fitted, the other being closed by a removable cap 6. The heads 2 are equipped with axially aligned bearings 7 for the low-speed shaft 8. The casing is suitably equipped with supporting legs or devices 9 adapted to be bolted to the floor or ceiling and may, in the event that the low-speed shaft 8 is vertically disposed, be provided with the supporting legs or devices 10 shown in dotted lines in Fig. 1.

Rigid with and, preferably keyed to the cylindrical wall 1 of the housing contiguous to an end-wall or head 2 thereof, is an internal gear 11. Keyed to the low-speed shaft or otherwise rigidly secured thereto, is a carrier 12 for the stud-shafts 13 on which planetary spur-gears 14 are rotatably mounted to mesh with the internal gear 11, there being a companion ring or plate 15 for the carrier 12 secured to the latter by means of the bolts 15ª and spacing sleeves 15ᵇ.

Rotatably mounted on the shaft 8 is a spur-pinion 16 also meshing with the planetary spur-gears or pinions 14 and having a long, sleeve-like hub 17 which carries the similar hub 18 of the bevel-gear 19 which is rendered rigid with the spur-pinion 16 by means of the long key 20. The bevel-pinion 21 on the high-speed shaft 5 meshes with said bevel-gear 19. The ring or plate 15 is rotatably mounted on the sleeve or hub 18 of the bevel-gear 19.

The several bearings 4 and 7 are equipped with suitable bushings 22 and 23, respectively, all provided at their inner ends with annular flanges 24 to provide thrust-bearing surfaces. Bushings 25 are provided between the shaft 8 and the hub 17 of the pinion 16, and provision for efficient lubrication is made, the housing or casing being adapted to be partly filled with lubrication oil to be circulated by means of the rotating parts.

In operation, the bevel gear 19 is rotated by the bevel pinion 21. The spur pinion 16 being rigid with gear 19, it rotates in unison therewith and effects rotation of the planetary gears 14 to cause the latter to travel around the internal gear 11. The carrier 12 is thus rotated and, being rigid with shaft 8, rotates the latter. The gear-ratio between shafts 5 and 8 is determined by the relative pitch-diameters of the bevel-gear elements 19 and 21 multiplied by the gear-ratio between the spur-gear 16 and internal gear 11. The shaft 8 will be rotated in the same direction as the pinion 16 and this direction will be determined by the direction of rotation of the high-speed shaft 5 and the position of the bevel-gear 19 with respect to the same.

For example, if, in the instance illustrated, the high-speed shaft rotates clockwise, the low-speed shaft will rotate anti-clockwise. If it is desired that the latter shall also rotate clockwise, then the casing or housing must be rotated through an arc of 180 degrees from the position shown and the bearing 4 change places with the cap 6.

The device is very simple and efficient in that it accomplishes its purpose with a very limited number of operating elements. It also affords a wide range of gear ratios of the high-reduction type while occupying minimum space and maximum strength. It is easily assembled and dissembled for repairs and replacements.

The ring 15 constitutes a very important balancing element for maintaining the planetary gears in proper alignment relatively to the internal gear 11 and the spur-pinion 16, in that it takes up strain tending to flex the stud-shafts and also counteracts the tendency of the hub of the bevel-gear 19 to swing on its longitudinal axis under the influence of the lateral stress applied by the bevel-pinion 21.

The specific relative arrangement of parts is obviously capable of variation and modification to meet all requirements without departing from the invention as defined in the appended claims.

I claim as my invention:—

1. A speed transformer including a casing equipped at opposite ends with bearings, a low-speed shaft journalled in said bearings, an internal gear disposed concentric with said bearings rigidly mounted in said casing, a pair of opposed planetary gear carriers rigid with said shaft one thereof keyed to the latter and equipped with stud-shafts extending through the other thereof, planetary gear pinions mounted on said stud-shafts, said last-named planetary gear carrier having a hub of larger diameter than said shaft, a sleeve rotatable on said shaft, and equipped at one end with a gear pinion meshing with said planetary gear pinions, a bevel gear having a long hub receiving and keyed to said sleeve and extending into the hub of the last named planetary gear carrier to constitute a bearing for the latter, a high-speed shaft extending angularly to said low-speed shaft, a bearing therefor in the peripheral wall of the casing, and a bevel-pinion on said shaft meshing with said bevel-gear.

2. A speed transformer including a casing equipped at opposite ends with bearings, a low-speed shaft journalled in said bearings, an internal gear disposed concentric with said bearings rigidly mounted in said casing, a pair of opposed planetary gear carriers rigid with said shaft, one thereof keyed to the latter and equipped with stud-shafts extending through the other thereof, planetary gear pinions mounted on said stud-shafts, said last named planetary gear carrier having a hub of larger diameter than said shaft, a sleeve rotatable on said shaft and equipped at one end with a gear pinion meshing with said planetary gear pinions, a bevel gear having its gear face opposed to and spaced from the last-named planetary gear carrier and having a long hub receiving and keyed to said sleeve and extending into the hub of the last named planetary gear carrier to constitute a bearing for the latter, a high-speed shaft extending angularly to said low-speed shaft, a bearing therefor in the peripheral wall of the casing, and a bevel-pinion on said shaft meshing with said bevel-gear.

3. A speed transformer including a casing equipped at opposite ends with bearings, a low-speed shaft journalled in said bearings, an internal gear disposed concentric with said bearings rigidly mounted in said casing, a pair of opposed planetary gear carriers rigid with said shaft, one thereof keyed to the latter and equipped with stud-shafts extending through the other thereof, planetary gear pinions mounted on said stud-shafts, said last-named planetary gear carrier having a hub of larger diameter than said shaft, a sleeve rotatable on said shaft and equipped at one end with a gear pinion meshing with said planetary gear pinions, a bevel gear having a long hub receiving and keyed to said sleeve and extending into the hub of the last named planetary gear carrier to constitute a bearing for the latter, a high-speed shaft extending angularly to said low-speed shaft, means disposed at diametrically opposite points in the peripheral wall of the casing for receiving a bearing for said high speed shaft, a removable bearing for said high-speed shaft adapted to be mounted at either of said diametrically opposite points on said casing, and a bevel pinion on said high-speed shaft meshing with said bevel gear.

4. A speed transformer including a casing equipped at opposite ends with bearings, a low-speed shaft journalled in said bearings, an internal gear disposed concentric with said bearings rigidly mounted in said casing, a pair of opposed planetary gear carriers rigid with said shaft, one thereof keyed to the latter and equipped with stud-shafts extending through the other thereof, planetary gear pinions mounted on said stud-shafts, said last named planetary gear carrier having a hub of larger diameter than said shaft, a sleeve rotatable on said shaft and equipped at one end with a gear pinion meshing with said planetary gear pinions, a bevel gear having its gear face opposed to and spaced from the last-named planetary gear carrier and having a long hub receiving and keyed to said sleeve and extending into the hub of the last named planetary gear carrier to constitute a bearing for the latter, a high speed shaft extending angularly to said low-speed shaft, means disposed at diametrically opposite points in the peripheral wall of the casing for receiving a bearing for said high speed shaft, a removable bearing for said high-speed shaft adapted to be mounted at either of said diametrically opposite points on casing, and a bevel pinion on said high speed shaft meshing with said bevel gear.

5. A speed transformer including a suitable frame element equipped with a plurality of alined bearings, a low-speed shaft journalled in at least one of said bearings, a bevel gear rotatably mounted on said shaft, a gear pinion non-rotatably associated with said bevel gear, an internal gear rigid with said frame element and concentric with said bearing and having its toothed face opposed to said gear pinion, planetary gear elements including carriers therefor operatively associated with said shaft and said gear pinion for transmitting motion from said bevel gear to said shaft, said bevel gear being provided with a long hub projecting into and carrying one of said planetary gear carriers, a high-speed shaft extending laterally of said first-named shaft, a bearing therefor in said frame element, and a bevel pinion rigidly mounted on said shaft and meshing with said bevel gear.

In testimony whereof, I have hereunto set my hand, this 22nd day of March, 1924.

LOUIS E. G. BUEHLER.